United States Patent [19]

Ray et al.

[11] Patent Number: 5,366,243
[45] Date of Patent: Nov. 22, 1994

[54] HEIGHT ADJUSTER FOR SEAT BELT SHOULDER STRAP

[75] Inventors: Gary M. Ray, Royal Oak, Mich.;
Kathleen K. Stawara, Gilbert, Ariz.;
Carl M. Petersen, III, Waterford, Mich.

[73] Assignee: TRW Vehicle Safety Systems Inc., Lyndhurst, Ohio

[21] Appl. No.: 37,990

[22] Filed: Mar. 25, 1993

[51] Int. Cl.⁵ ............................................. B60R 22/20
[52] U.S. Cl. ................................. 280/801.2; 297/483
[58] Field of Search ............... 280/801 A, 801 R, 808, 280/801.1, 801.2, 808; 297/468, 483

[56] References Cited

U.S. PATENT DOCUMENTS

| | | | |
|---|---|---|---|
| 4,453,741 | 6/1984 | Hipp et al. | 280/801 |
| 4,556,255 | 12/1985 | Kawai | 297/483 |
| 4,579,368 | 4/1986 | Kawade et al. | 280/808 |
| 4,989,900 | 2/1991 | Steinhüser | 280/801 R |

*Primary Examiner*—Richard M. Camry
*Assistant Examiner*—Paul N. Dickson
*Attorney, Agent, or Firm*—Tarolli, Sundheim & Covell

[57] ABSTRACT

A height adjuster (10) for a shoulder belt (26) includes a base (20) which is mountable on a vehicle body and has a plurality of apertures (58). A carriage mechanism (80) is slidable along the base (20) and carries a belt guide (82). A latch mechanism (84) also is carried on the carriage mechanism (80). The latch mechanism (84) includes a latch member (190) which is pivotable about a first axis (210) relative to the carriage mechanism (80). The latch member (190) has an end portion (196) receivable in one of the apertures (58) for blocking movement of the carriage mechanism (80) relative to the base (20). At least one manually engageable release lever (240) is carried on the carriage mechanism (80) and is pivotable about a second axis (264) transverse to the first axis (210). The release lever (240) has a first portion (254) engageable with the latch member (190) for pivoting the latch member (190) about the first axis (210) to remove the end portion (196) of the latch member (190) from the one of the apertures (58) to release the carriage mechanism (80) for sliding movement relative to the base (20). The release lever (240) has a manually engageable second portion (248) for pivoting the release lever (240) about the second axis (264).

19 Claims, 7 Drawing Sheets

HEIGHT ADJUSTER FOR SEAT BELT SHOULDER STRAP

BACKGROUND OF THE INVENTION

The present invention relates to a height adjuster for a shoulder belt for an occupant of a vehicle.

A shoulder belt in a vehicle typically extends from a seat belt retractor through a seat belt guide (D-ring) mounted on a pillar of the vehicle and downward across the shoulder and torso of the vehicle occupant. The location of the D-ring in part determines the angle at which the shoulder belt extends from the D-ring across the occupant's torso. Depending upon the D-ring location, the shoulder belt may be uncomfortable to the occupant. Thus, it is known to mount a D-ring on the vehicle pillar in a manner which permits height adjustment of the D-ring. The D-ring can then be located in a position which is most comfortable for the vehicle occupant.

SUMMARY OF THE INVENTION

The present invention is an apparatus that includes a base which is mountable on a vehicle body. The base has a plurality of apertures. A carriage is slidable on the base, and a seat belt guide (D-ring) is carried on the carriage.

A latch member also is carried on the carriage. The latch member is pivotable about a first axis relative to the carriage. The latch member has a locking portion receivable in one of the apertures in the base for blocking sliding movement of the carriage on the base.

The apparatus further includes at least one manually engageable release lever carried on the carriage. The release lever is pivotable about a second axis transverse to the first axis. The release lever has a first portion engageable with the latch member for pivoting the latch member about the first axis to remove the locking portion of the latch member from the one of the apertures to permit sliding movement of the carriage on the base. The release lever has a second portion which is manually engageable for pivoting the release lever about the second axis.

BRIEF DESCRIPTION OF THE DRAWINGS

The foregoing and other features of the present invention will become apparent to one skilled in the art to which the present invention relates upon consideration of the following description of the invention with reference to the accompanying drawings wherein.

DESCRIPTION OF A PREFERRED EMBODIMENT

Figure 1:
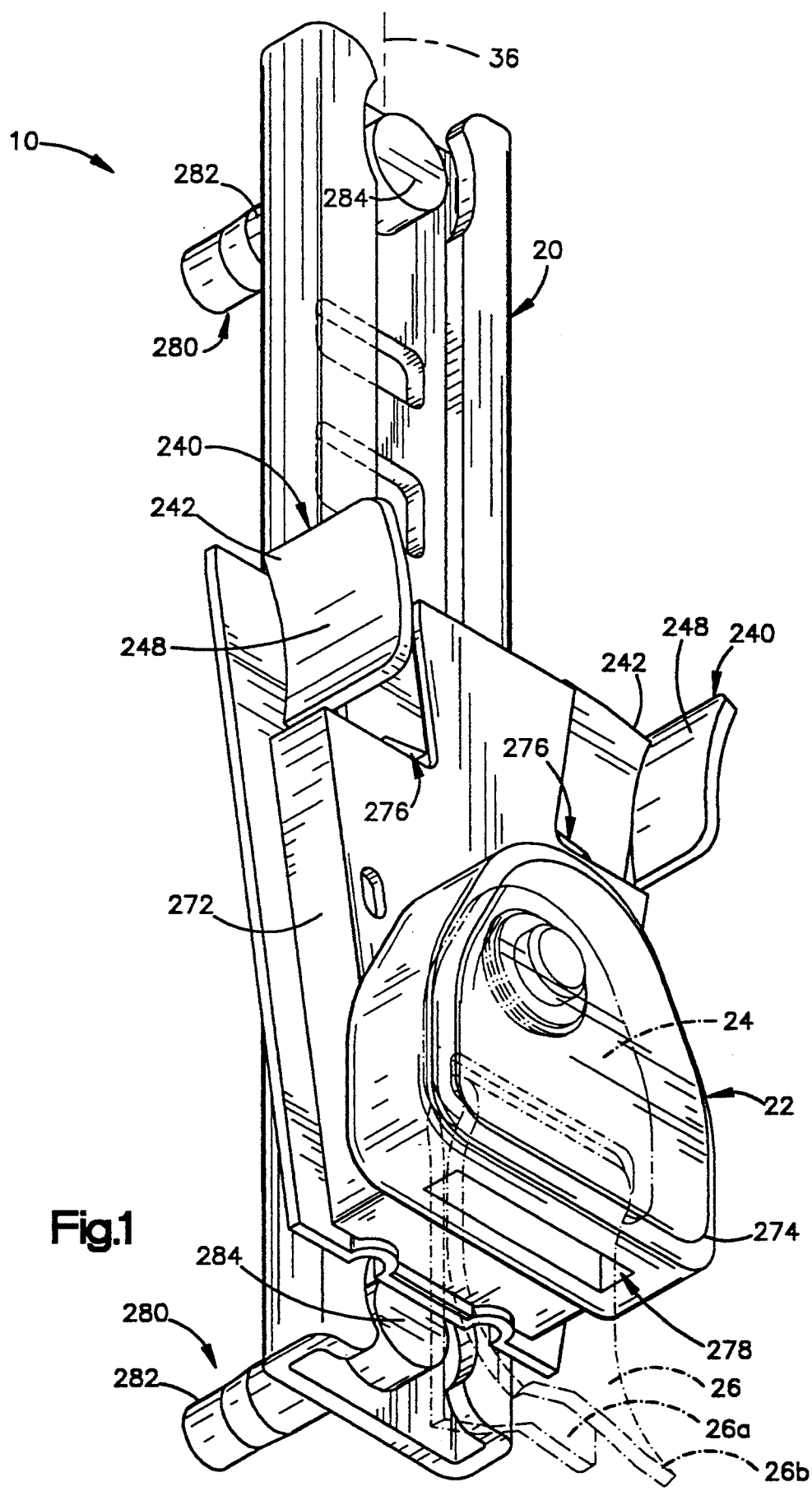
FIG. 1 is a view of an apparatus constructed in accordance with the present invention.

A shoulder belt height adjuster 10 constructed in accordance with the present invention is shown in FIG. 1. The height adjuster 10 includes a base 20 and an assembly 22. The assembly 22 is slidable relative to the base 20. A D-ring 24 of the assembly 22 guides and supports a shoulder belt 26 of a seat belt. The shoulder belt 26 has a portion 26a connected to a seat belt retractor (not shown) and a portion 26b which extends across the torso of a vehicle occupant. The shoulder belt 26 extends from the seat belt retractor and through an opening in the D-ring 24.

The base 20 (FIG. 2) is an elongate metal part. As viewed in FIG. 2, the base 20 has a top end 30 and a bottom end 32. A longitudinal axis 36 of the base 20 extends along a line from the top end 30 to the bottom end 32. As viewed in FIG. 2, the base 20 has a back wall 38, right and left side walls 40, and right and left front wall segments 44. The back wall 38, side walls 40 and front wall segments 44 define a longitudinally extending track 48.

The back wall 38 extends in a plane parallel to the axis 36 and along the entire length of the base 20 between the top end 30 and the bottom end 32. The wall 38 has a flat front surface 50. A mounting hole 52 extends through the wall 38 adjacent to the top end 30 and a mounting hole 54 extends through the wall 38 adjacent to the bottom end 32. A plurality of apertures 58 extend through the wall 38 and are defined by surfaces 60. The apertures 58 are spaced apart from each other by predetermined distances and are located between the mounting holes 52 and 54. In the preferred embodiment, five apertures extend through the wall 38 and are identified as 58a–58e.

Figure 2:
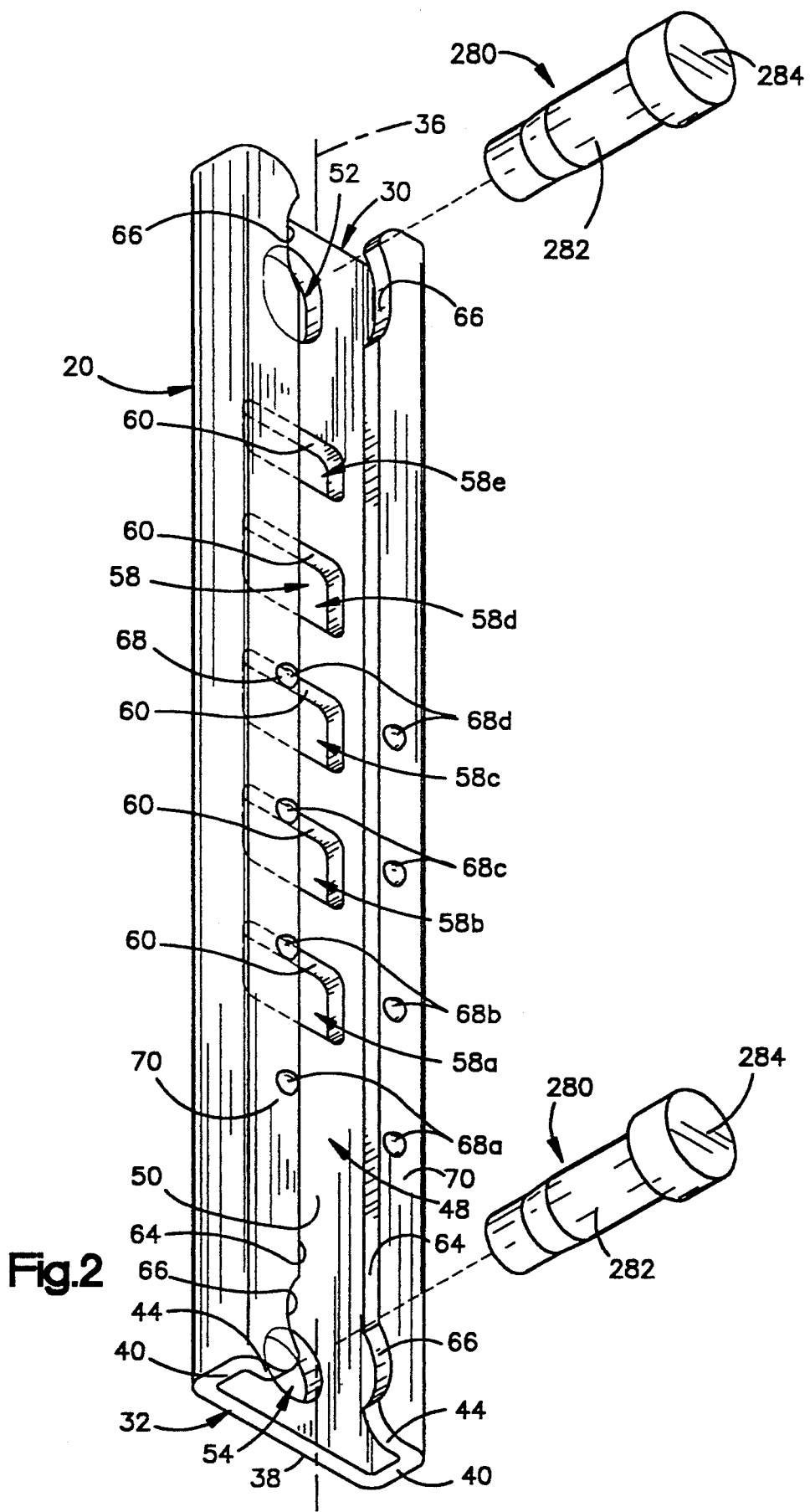
FIG. 2 is a view of a part of the apparatus shown in FIG. 1.

The right and left side walls 40 extend from the wall 38 at left and right sides of the wall 38, respectively, as viewed in FIG. 2. Each of the side walls 40 extends parallel to the axis 36 and perpendicular to the wall 38. The side walls 40 each extend the entire length of the base 20.

The right and left wall segments 44 extend perpendicular to and inward from the right and left walls 40, respectively. Each wall segment 44 extends parallel to, and partially overlies, the wall 38. The wall segments 44 extend the entire length of the base 20. Each wall segment 44 terminates at a respective edge 64. The edges 64 face each other and are spaced apart. Each edge 64 has indented portions 66 adjacent to the mounting holes 52 and 54.

A plurality of projections 68 extend from flat, front surfaces 70 of the wall segments 44. Each projection 68 has a convex button shape. In the preferred embodiment, four projections 68 are located on each wall segment 44 and are identified as 68a–68d. The projections 68 on each wall segment 44 are uniformly spaced from each other along the longitudinal extent of the base 20.

Each respective projection 68a–68d is associated with a respective aperture 58a–58d, e.g., the projections 68a are associated with the aperture 58a. Each respective projection 68a–68d is spaced from the respective associated aperture 58a–58d a respective predetermined distance along the axis 36. The respective predetermined distances are equal.

Figure 5:
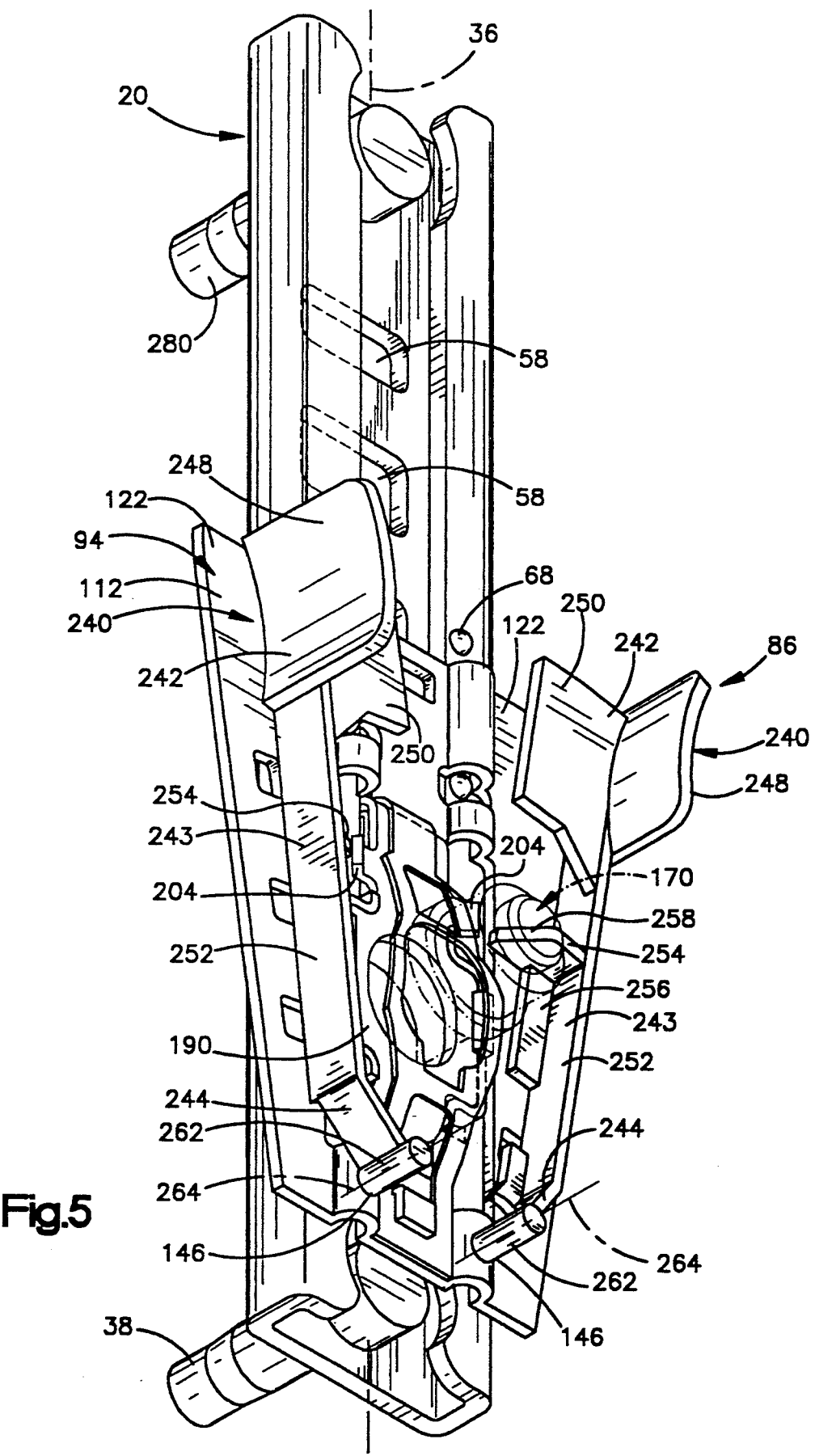
FIG. 5 is also a view of the apparatus shown in FIG. 1 with certain parts removed.

The assembly 22 (FIG. 3) includes a carriage mechanism 80, a seat belt guide 82, a latch mechanism 84 and a release mechanism 86 (FIG. 5). The carriage mechanism 80 (FIG. 3) includes a slider 92 and a retainer 94.

Figure 6:
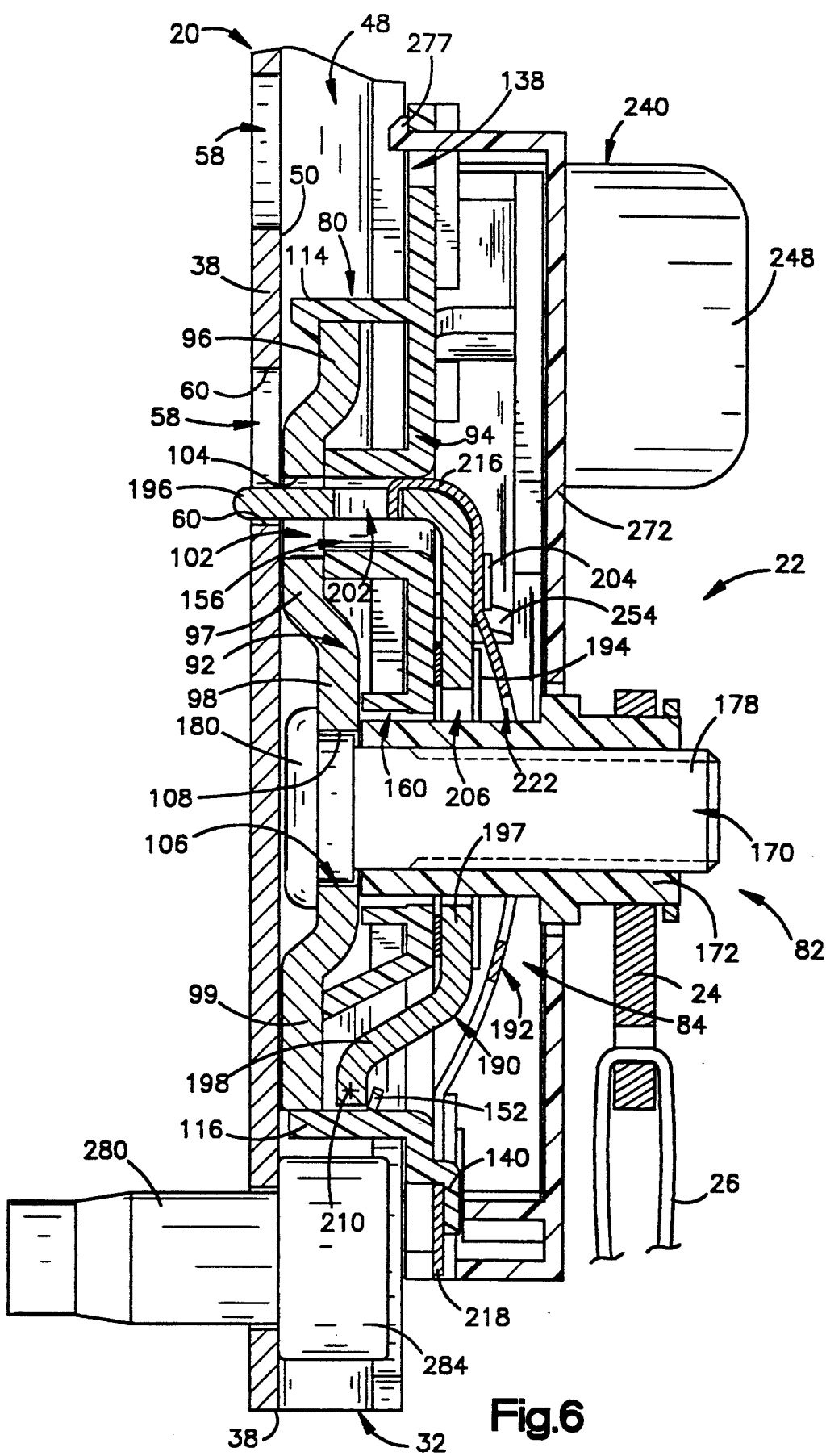
FIG. 6 is a partial, enlarged, cross-sectional view of the apparatus of FIG. 1 showing parts in a first operational position.

The slider 92 is a metal part. The slider 92 has four planar portions 96-99 (see FIG. 6). As seen in FIG. 6, planar portion 96 is at the upper end of the slider 92. Planar portions 97, 98, and 99 are located sequentially along the slider 92 below the planar portion 96. The slider 92 is bent between the first and second planar portions 96 and 97, between the second and third planar portions 97 and 98 and between the third and fourth planar portions 98 and 99. The planar portions 96-99 extend parallel to each other. The first and third planar portions 96 and 98 extend along a first plane and the second and fourth planar portions 97 and 99 extend along a second plane, spaced apart from the first plane. An opening 102 extends through the second planar portion 97 and is defined by a surface 104. An opening 106 extends through the third planar portion 98 and is defined by a surface 108.

The slider 92 is located within the base 20 and is movable along the track 48 defined by the base 20. The slider 92 is sized such that the slider 92 is only removable from the track 48 at either the top end 30 or the bottom end 32 of the base 20. The second and fourth planar portions 97 and 99 of the slider 92 engage the wall 38 of the base 20. The first and third planar portions 96 and 98 of the slider 92 are spaced away from the wall 38. During movement of the slider 92 relative to the base 20, the second and fourth planar portions 97 and 99 slide across the front surface 50 of the wall 38.

The retainer 94 (FIG. 3) is a plastic part. As viewed in FIG. 3, the retainer 94 has a generally planar front portion 112, upper and lower rearwardly extending arms 114 and 116, and a central bridge portion 118. The front portion 112 (FIG. 4) has a generally trapezoidal shape.

Figure 4:
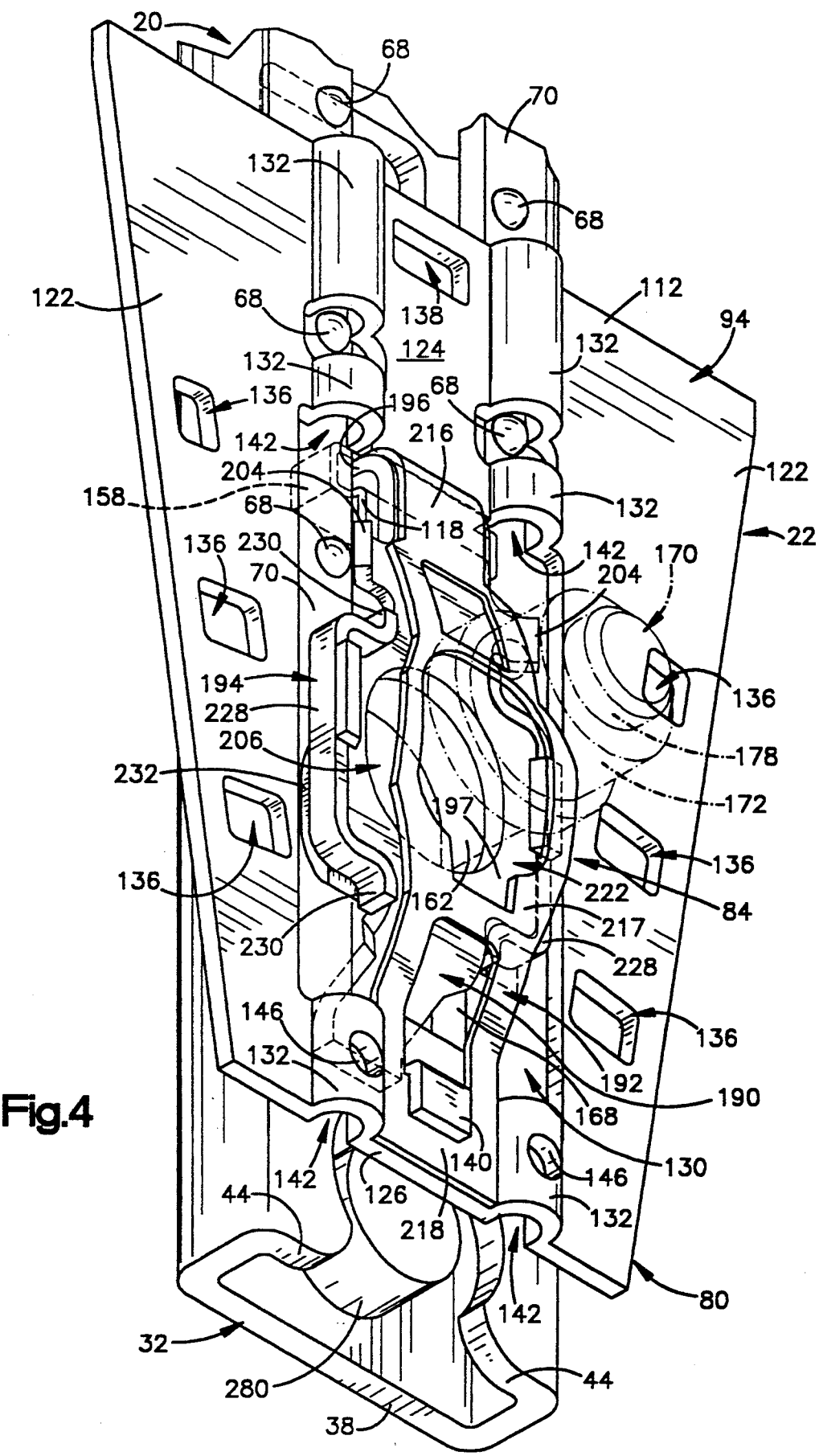
FIG. 4 is a view of a portion of the apparatus shown in FIG. 1 with certain parts removed.

As viewed in FIG. 4, the front portion 112 includes right and left wing segments 122, an upper middle segment 124, and a lower middle segment 126. The wing segments 122 and the middle segments 124 and 126 are generally co-planar and define a central opening 130 in the front portion 112. Raised portions 132 of the front portion 112 connect each wing segment 122 to the middle segments 124 and 126.

A plurality of openings 136 extend through each of the wing segments 122. An opening 138 extends through the upper middle segment 124. A downwardly hooked tang 140 extends from the lower middle segment 126.

The raised portions 132 define channels 142. One of the channels 142 extends adjacent to the right wing segment 122 and each of the middle segments 124 and 126. The other of the channels 142 extends adjacent to the left wing segment 122 and each of the middle segments 124 and 126. The raised portions 132, which connect the wing segments 122 and the lower middle segment 126, have circular openings 146 located on the front of the raised portions 132. The openings 146 extend through the raised portions 132.

Figure 3:
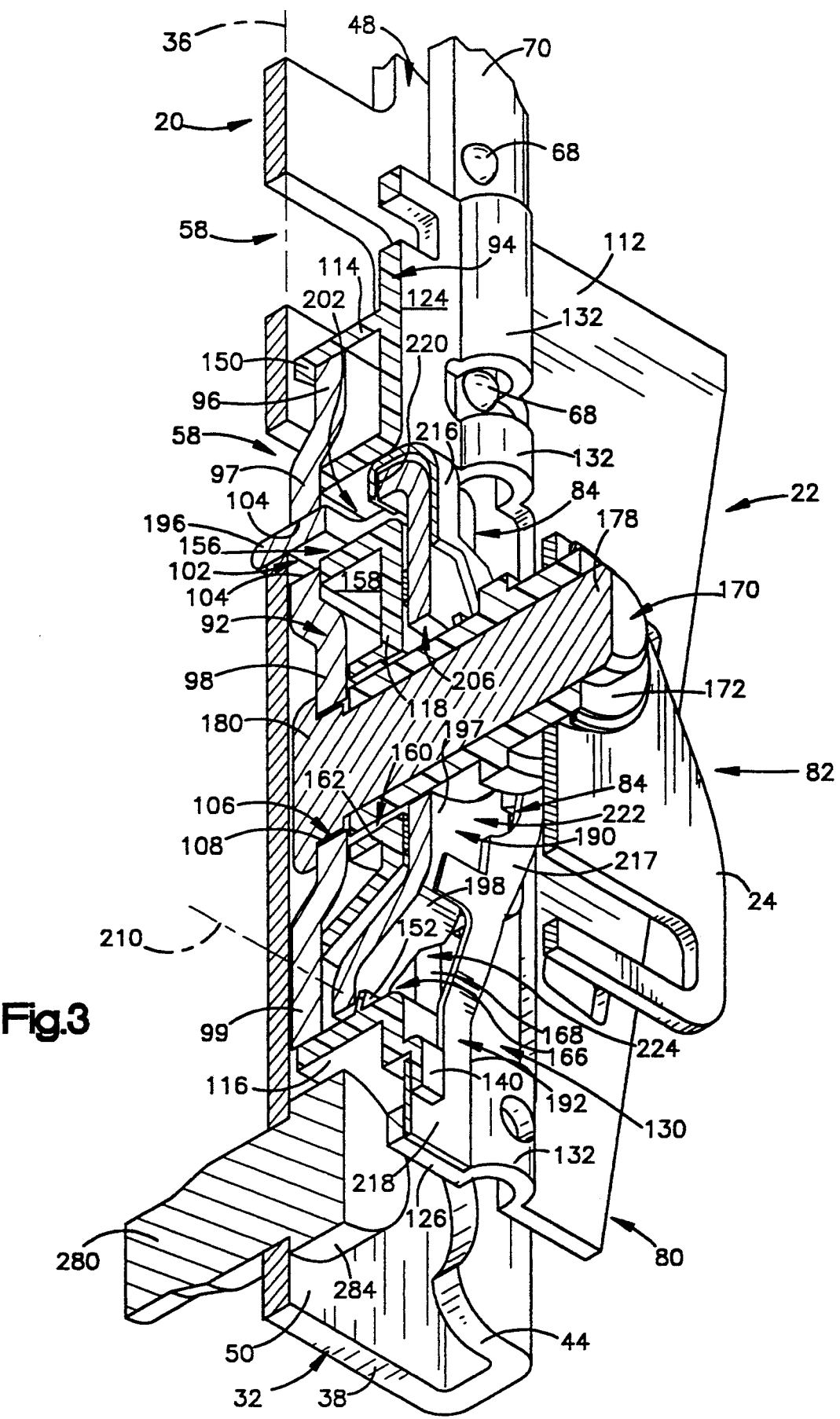
FIG. 3 is a sectional view of a portion of the apparatus shown in FIG. 1 with certain parts removed.

The upper arm 114 (FIG. 3) of the retainer 94 extends from the upper middle segment 124 of the retainer 94. The upper arm 114 has a T-shaped end portion (not shown). The upper arm 114 also has a tab 150. As shown in FIG. 3, the tab 150 is located at a rearward end of the upper arm 114 and extends downwardly. The lower arm 116 of the retainer 94 extends from the lower middle section 126 of the retainer 126. As shown in FIG. 3, a tab 152 is located midway along the lower arm 116 and extends upwardly from the lower arm 116.

The bridge portion 118 is connected to the upper middle segment 124 of the front portion 112 and is connected to the lower middle segment 126 of the front portion 112. The bridge portion 118 extends between the upper middle segment 124 and the lower middle segment 126. A tubular projection 158 of the bridge portion 118 is located adjacent to the upper middle segment 124 of the front portion 112. The tubular projection 158 extends rearwardly from the plane of the front portion 112. The tubular projection 158 defines an opening 156. The tubular projection 158 encircles the opening 156. The opening 156 extends through the retainer 94, from front to back.

A tubular projection 162 of the bridge portion 118 is located midway along the bridge portion 118. The tubular projection 162 extends rearwardly. The tubular projection 162 defines an opening 160. The tubular projection 162 encircles the opening 160.

Right and left sections 168 (only the right section 168 is shown in the drawings) of the bridge portion 118 extend to the lower middle segment 126 and the lower arm 116. The right and left sections 168 and the lower arm 116 define a slot opening 166. The slot opening 166 extends through the bridge portion 118 adjacent to the lower arm 116.

The retainer 94 is located relative to the slider 92 such that the tab 150 of the retainer 94 extends behind the first planar portion 96 of the slider 92. The fourth planar portion 99 of the slider 92 abuts against the lower arm 116 of the retainer 94 at a location spaced away from the tab 152. The tubular portion 158 of the bridge portion 118 rests against the second planar portion 97 of the slider 92, and the tubular projections 162 rests against the third planar portion 98 of the slider 92. Thus, the slider 92 and the retainer 94 are engaged together.

The front portion 112 of the retainer 94 rests against the front surfaces 70 of the wall segments of the base 20. The T-shaped end portion (not shown) of the upper arm 114 of the retainer 94 extends behind the wall segments 44 of the base 20. The retainer 94 is slidable relative to the base 20 along the axis 36. The raised portions 132 provide clearance for the projections 68 during movement of the retainer 94 relative to the base 20. Thus, the carriage mechanism 80, which includes the slider 92 and the retainer 94, is movable along the track of the base 20. Moreover, the carriage mechanism 80 is only removable from the track 48 at either the top end 30 or the bottom end 32 of the base 20.

The belt guide 82 is carried on the carriage mechanism 80. The belt guide 82 includes a stud 170, a bushing 172 and the D-ring 24. The stud 170 is a metal part. The stud 170 has a shaft 178 and a head 180. The shaft 178 extends forward, through the opening 106 of the slider 92. The head 180 is sized larger than the opening 106 so as to engage the slider 92. The head 180 is located in the area between the third planar portion 98 of the slider 92 and the wall 38 of the base 20.

The bushing 172 is cylindrical in shape and extends around the shaft 178. The bushing 172 engages the shaft 178 and also engages the slider 92 to prevent movement of the stud 170 relative to the slider 92. The D-ring 24 is movably mounted on the bushing 172.

The latch mechanism 84 (FIG. 4) is carried on the carriage mechanism 80. The latch mechanism 84 includes a latch member 190, a latch spring 192, and a pilot member 194. The latch member 190 is a metal part.

As shown in FIG. 6, the latch member 190 has upper, middle and lower sections 196–198. The upper section 196 extends perpendicular to the middle section 197 and the lower section 198 extends at an angle relative to the middle section 197.

An opening 202 extends through the upper section 196. The middle section 197 has two fingers 204 (FIG. 4) located near the upper section 196. As viewed in FIG. 4, one of the fingers 204 extends toward the right and the other of the fingers 204 extends toward the left. Both of the fingers 204 are bent forward slightly and have rear surfaces (not shown). An opening 206 extends through the middle section 197.

The upper section 196 (FIG. 6) of the latch member 190 extends through the opening 156 of the retainer 94 and also extends through the opening 102 of the slider 92. The upper section 196 is also extendable into one of the apertures 58 of the base 20. The shaft 178 of the stud 170 and the bushing 172 extend through the opening 206 of the middle section 197 without engaging the latch member 190. The lower section 198 of the latch member 190 extends into the space between the tab 152 of the retainer 94 and the fourth planar portion 99 of the slider 92.

Figure 7:
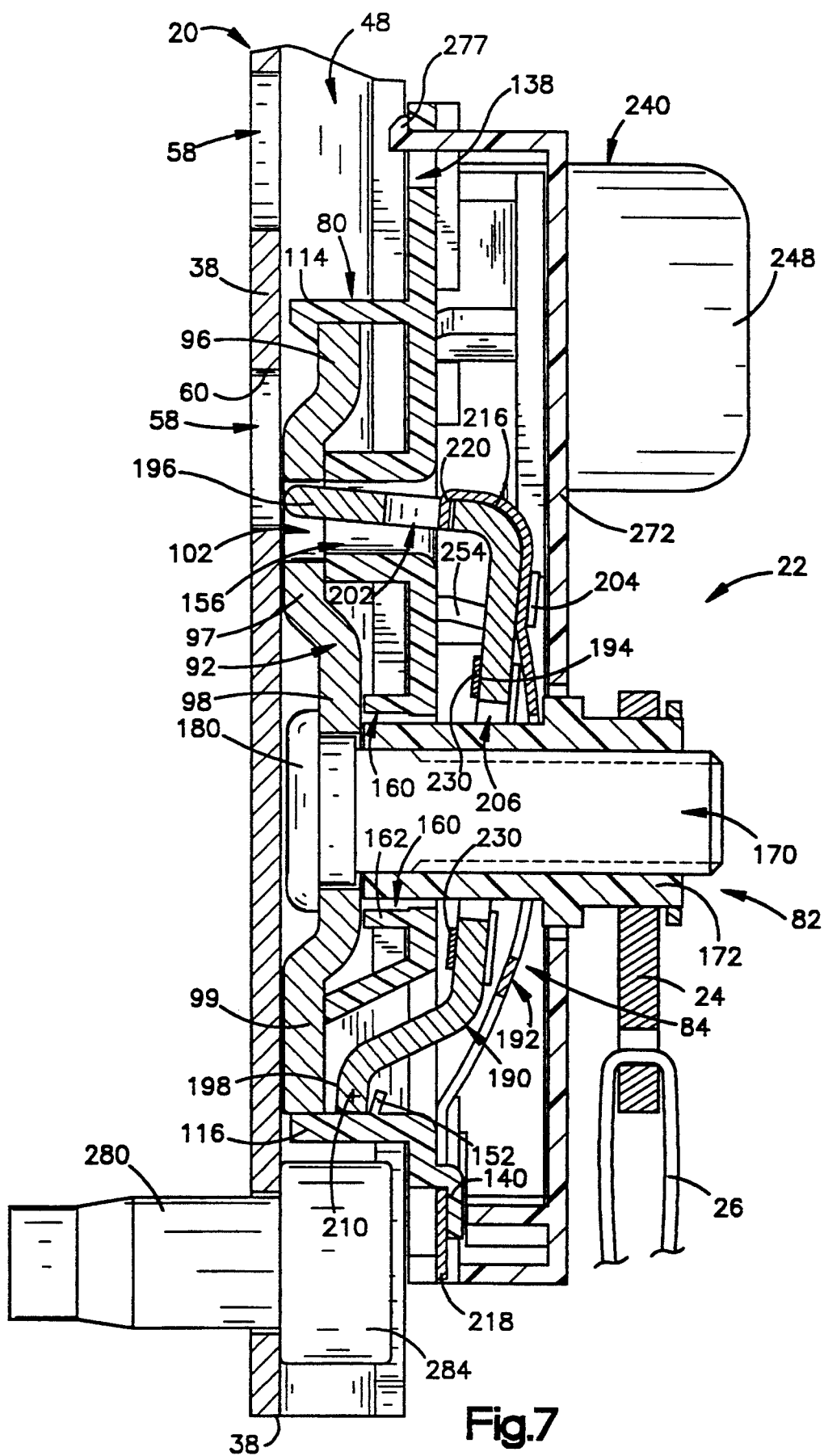
FIG. 7 is a view similar to FIG. 6 but showing parts in another operational position.

The latch member 190 is pivotable about an axis 210 between a rest position, shown in FIG. 6, and a displaced position, shown in FIG. 7. The axis 210 (FIG. 3) is oriented transverse, specifically, perpendicular, to the axis 36 of the base 20 and parallel to the plane of the fourth portion 99 of the slider 92. The latch member 190 is movable a short distance relative to the carriage mechanism 80 in a longitudinal direction. At least a portion of the lower section 198 remains within the space between the tab 152 of the retainer 94 and the fourth planar portion 99 of the slider 92 during relative movement of the latch member 190.

The latch spring 192 is made of spring steel. As shown in FIG. 3, the latch spring 192 has upper, middle and lower sections 216–218. The upper section 216 of the latch spring 192 has a bent tab 220. An opening 222 extends through the middle section 217 of the latch spring 192. An opening 224 extends through the lower section 218 of the latch spring 192.

The latch spring 192 extends generally along the front of the latch member 190. The tab 220 of the latch spring 192 extends into the opening 202 of the latch member 190 to grip the latch member 190. The tang 140 of the retainer 94 extends through the opening 224 of the latch spring 192. The latch spring 192 partially extends under the tang 140 of the retainer 94.

The shaft 178 of the stud 170 and the bushing 172 extend through the opening 222 of the middle section 217 of the latch spring 192 without engaging the latch spring 192. The latch spring 192 transmits a rearward force to the upper section 196 of the latch member 190, as viewed in FIG. 3, to pivot the latch member 190 about the axis 210 toward one of the apertures 58. The latch spring 192 also transmits a downward force to the latch member 190, as viewed in FIG. 3, to urge the latch member 190 toward the lower arm 116 of the retainer 94.

The pilot member 194 (FIG. 4) is made of a durable material such as plastic. The pilot member 194 includes two side sections 228 and two middle sections 230. Each middle section 230 extends between the side sections 228 such that the pilot member 194 has a generally square ring shape. Each side section 228 has a rearwardly facing ramp portion 232.

The pilot member 194 is located adjacent to the middle section 197 of the latch member 190. The side sections 228 of the pilot member 194 extend along the right and left sides of the middle section 197 of the latch member 190. The shaft 178 of the stud 170 and the bushing 172 extend through the pilot member 194. Each side section 228 is located adjacent to one of the wall segments 44 of the base 20. Each ramp portion 232 rests against either the surface 70 or one of the projections 68 of the base 20, depending upon the location of the pilot member 194 relative to the base 20.

The middle sections 230 of the pilot member 194 extend behind the latch member 190. The middle section 197 of the latch member 190 is displaced forward when the ramp portions 232 engage the projections 68. Displacement of the middle section 197 forward is associated with the latch member 190 being pivoted about the axis 210 (FIG. 7) to the displaced position shown in FIG. 7.

The release mechanism 86 (FIG. 5) of the assembly 22 includes a pair of release levers 240 and a spring member (not shown). The release levers 240 are made of a durable material, such as plastic. As viewed in FIG. 5, each release lever 240 has upper, middle and lower sections 242–244. Each upper section 242 includes an outer concave tab 248 and a stop 250. The stops 250 are located inwardly of the tabs 248 and project toward each other.

Each middle section 243 has an elongate body 252, a ramp projection 254 and a support projection 256. The body 252 extends between the upper section 242 and the lower section 244. The ramp projection 254 is located midway along the middle section 243 and extends inwardly from the body 252. The ramp projection 254 has a ramp surface 258, which slopes frontward, toward its associated body 252. Each support projection 256 is located toward a rearward edge of its associated body 252. Each support projection 256 extends inwardly from the body 252, adjacent to the respective ramp projection 254.

Each lower section 244 extends at an angle relative to the respective middle section 243. At its distal end, each lower section 244 includes a cylindrical pivot pin 262. Each pivot pin 262 has an axis 264, which is perpendicular to the longitudinal extent of the respective release lever 240. The axes 264 are also perpendicular to the axis 210 and perpendicular to the axis 36 (FIG. 3).

The release levers 240 (FIG. 5) are located adjacent to the front portion 112 of the retainer 94. Each pivot pin 262 extends into a respective one of the openings 146. Each pivot pin 262 is rotatable about its respective axis 264, within the respective opening 146. Thus, each release lever 240 is pivotable about the respective axis 264. Pivoting of each release lever 240 is through an arc which extends from a rest position, shown in FIG. 5, of the release lever 240 inwardly to an end position. During pivoting of both release levers 240, the stops 250 will engage each other at the end position.

Each release lever 240 extends adjacent to a respective one of the wing segments 122 of the retainer 94. Each ramp projection 254 is located adjacent to a respective finger 204 of the latch member 190. Upon pivoting of said release levers 240, the ramp surfaces 258 of the ramp projections 254 engage the rear surfaces (not shown) of the fingers 204. The ramp surfaces 258 slide along the rear surfaces of the fingers 204 and push the fingers 204 forward. As the fingers 204 are pushed forward, the latch member 190 is pivoted about the axis 210 (FIG. 3).

The assembly 22 also includes a cover 272 (FIG. 1) and a cover 274. The cover 272 has two openings 276, a third opening (not shown) and a plurality of locking projections 277 (only one shown in FIGS. 6 and 7). The openings 276 (FIG. 1) are located adjacent to the upper sections 242 of the release levers 240. Each release lever 240 extend through a respective opening 276 such that the tabs 248 are exposed and accessible to the vehicle occupant. The stud 170 and bushing 172 extend through the opening of the cover 272 which is not shown. The locking projections 277 snap into the openings 136 and 138 to hold the cover 272 on the retainer 94.

The release levers 240 are biased outwardly (to the left and right, respectively) by the spring (not shown) into engagement with the cover 272 when the release levers 240 are in the rest positions. Thus, the cover 272 prevents further outward pivoting of the release levers 240.

The cover 274 has an opening 278 and an opening (not shown). The cover 274 surrounds the D-ring 24. The shoulder belt 26 extends through the opening 278 to the D-ring 24. The stud 170 and the bushing 172 extend through the opening which is not shown.

A pair of mounting bolts 280 (FIG. 2) are utilized to hold the base 20 on a pillar of the vehicle. Each bolt 280 has a shaft 282 and an oversized head 284. The shafts 282 extend through the mounting holes 52 and 54 of the base 20. The oversized heads 284 block the ends of the track 48 of the base 20. Thus, the assembly 22 (FIG. 1) is prevented from being removed from the track 48 of the base 20.

In operation, during wearing of the shoulder belt 26 (FIG. 6) by an occupant of the vehicle, the upper portion 196 of the latch member 190 extends through the opening 102 in the slider 92 and into one of the apertures 58. Movement of the carriage mechanism 80 along the track 48 is limited to the amount permitted by the upper portion 196 of the latch member 190 moving within the opening 102 and the respective one of the apertures 58.

During sudden vehicle deceleration, the shoulder belt 26 restrains the vehicle occupant. A downwardly directed force (as viewed in the figures) is applied to the D-ring 24 of the belt guide mechanism 82 via the shoulder belt 26. The downwardly directed force is transmitted to the carriage mechanism 80 via the stud 170. The carriage mechanism 80 then moves slightly downwardly.

As the carriage mechanism 80 is moved slightly downwardly, the upper section 196 of the latch member 190 is brought into firm engagement with the lower portion of the surface 60 defining the respective aperture 58 through which the upper section 196 of the latch member 190 extends. The lower section 198 of the latch member 190 is moved slightly upwardly relative to the lower arm 116 against the bias of the latch spring 192. The surface 104 defining the opening 102 in the slider 92 is brought into firm engagement with the upper section 196 of the latch member 190. The upper section 196 of the latch member 190 is then firmly clamped between the surface 104 of the slider 92 and the surface 60 of the respective aperture 58 in the base 20, and is locked in the respective aperture 58 to prevent further movement of the carriage mechanism 80 relative to the base 20 (as shown in FIG. 3). Thus, the D-ring 24 of the belt guide mechanism 82 is prevented from moving along the longitudinal direction.

Adjustment of the height of the assembly 22 relative to the base 20 is accomplished in an expedient manner. With the shoulder belt 26 in an unstressed state, thereby preventing the rigid locking condition discussed above, the latch spring 192 biases the latch member 190 to a relaxed position such that the lower section 198 of the latch member 190 is adjacent to the lower arm 116 of the retainer 94, as shown in FIG. 6. Thus, the upper section 196 of the latch member 190 may be removed from the respective aperture 58 against the bias of the latch spring 192.

Removal of the upper section 196 of the latch member 190 from the respective aperture 58 is accomplished by the vehicle occupant grasping the tabs 248 (FIG. 1) on the release levers 240 with finger and thumb. The tabs 248 are moved inwardly toward each other by the vehicle occupant. As the tabs 248 are moved inwardly, each release lever 240 is pivoted about the respective axis 264 (FIG. 5).

The ramp projections 254 on the release levers 240 are moved into engagement with the fingers 204 on the latch member 190. Each ramp surface 258 cams across the rear surfaces (not shown) of the fingers 204 in a sliding action. The ramp projections 254 move the fingers 204. Thus, the latch member 190 is pivoted (clockwise as shown in FIG. 7) about the axis 210, such that the upper section 196 of the latch member 190 is removed from the respective aperture 58. The carriage mechanism 80 may then slide along the track 48 of the base member 20 to adjust the height of the assembly 22. It should be noted that pivoting of only one of the release levers 240 will cause the upper section 196 of the latch member 190 to be removed from the respective aperture 58 because the release levers 240 act independently of each other to pivot the latch member 190.

After height adjustment is accomplished, the tabs 248 are released by the vehicle occupant. The spring (not shown) bias the release levers 240 outwardly. The latch spring 192 biases the upper section 196 of the latch member 190 into engagement with the wall 38 or into an aperture 58. If the upper section 196 of the latch member 190 engages the wall 38, a slight push or pull on the assembly 22 will cause the upper section 196 of the latch member 190 to become aligned with one of the apertures 58 and will permit the upper section 196 to extend into the aperture 58 under the bias of the latch spring 192.

The height of the assembly 22 (FIG. 1) relative to the base 20 can be quickly adjusted in the upward direction by simply pushing upwardly on the assembly 22. The projections 68a–68d (FIG. 2) are utilized to remove the upper section 196 (FIG. 3) of the latch member 190 from the apertures 58a–58d, respectively. Slight upward movement of the assembly 22 is permitted due to movement of the upper section 196 of the latch member 190 within the opening 102 and the aperture 58 (for example, aperture 58a). As the assembly 22 is moved upwardly, the ramp portions 232 (FIG. 4) on the pilot member 194 slide along the front surfaces 70 of the wall segment 44 and engage one of the sets of projections 68 (e.g., corresponding projections 68a).

As the assembly 22 is moved upwardly, the ramp portions 232 ride over the projections 68. The ramp portion 232 and the pilot member 194 are thus pivoted forward. Pivoting of the pilot member 194 forward pivots the latch member 190 (clockwise as shown in FIG. 7) about the axis 210 against the bias of the spring 192. Thus, the upper section 196 of the latch member 190 is lifted out of the respective aperture 58 (e.g., aperture 58a) of the base 20.

As the assembly 22 is moved farther up the base 20, the ramp portions 232 (FIG. 4) move beyond the respective pair of projections 68 and the ramp portions 232 again engage the front surfaces 70 of the wall segments 44. The latch spring 192 then biases the upper section 196 of the latch member 190 into engagement with the wall 38. Upon further upward movement of the assembly 22, the upper section 196 of the latch member 190 becomes aligned with an adjacent aperture 58 (e.g., aperture 58b), and the bias of the latch spring 192 causes the upper section 196 of the latch member 190 to move into the adjacent aperture 58 (e.g., aperture 58b). The method can be repeated for each successive aperture (58b-58d) by pushing the assembly 22 upwardly so as to engage the ramp portions 232 with successive projections (68b-68d).

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    a base mountable on a vehicle body, said base having an axis and a plurality of apertures, said base having a plurality of projections spaced from each other along said axis of said base;
    a carriage axially slidable on said base;
    a seat belt guide carried on said carriage;
    a latch mechanism carried on said carriage, said latch mechanism being pivotable about a first axis relative to said carriage, said latch mechanism having a locking portion receivable in one of said apertures for blocking sliding movement of said carriage on said base, said latch mechanism including a latch member pivotable about said first axis and having a first end portion and a second end portion, said first end portion being supported for pivotal movement about said second end portion upon pivotal movement of said latch member about said first axis, said first end portion of said latch member being said locking portion of said latch mechanism, said latch mechanism including a pilot member having a ramp surface in sliding contact with said base and engageable with said projections upon sliding movement of said carriage, said projections lifting said pilot member relative to said base when said ramp surface on said pilot member moves in sliding contact with said projections on said base, said pilot member being engaged with said latch member to move said first end portion of said latch member out of said one of said apertures;
    spring means for biasing said latch member toward said apertures in said base; and
    lever means for releasing said latch mechanism to permit sliding movement of said carriage on said base, said lever means including a release lever carried on said carriage, said release lever being pivotable about a second axis transverse to said first axis, said release lever having an unlocking portion engageable with said latch mechanism for pivoting said latch mechanism about said first axis to remove said locking portion of said latch mechanism from said one of said apertures, said release lever having a manually engageable portion for pivoting said release lever about said second axis.

2. An apparatus as defined in claim 1 wherein each of said projections is located relative to an associated one of said apertures so as to be engaged by said ramp surface on said pilot member to pivot said first end portion of said latch member out of said associated aperture upon movement of said carriage in a first direction along said axis of said base.

3. An apparatus as defined in claim 2 wherein the first direction is opposite to the direction along said axis of said base in which force is applied to said carriage by a seat belt engaged with said seat belt guide during restraint of a vehicle occupant by the seat belt.

4. An apparatus comprising:
    a base mountable on a vehicle body, said base having a plurality of apertures;
    a carriage slidable on said base, said carriage including a slider member with an opening located adjacent to said apertures in said base;
    a seat belt guide carried on said carriage;
    a latch mechanism carried on said carriage, said latch mechanism being pivotable about a first axis relative to said carriage, said latch mechanism having a locking portion receivable in one of said apertures for blocking sliding movement of said carriage on said base, said latch mechanism including a latch member pivotable about said first axis and having a first end portion and a second end portion, said first end portion being supported for pivotal movement about said second end portion upon pivotal movement of said latch member about said first axis, said first end portion of said latch member being said locking portion of said latch mechanism and extending through said opening in said slider member and into one of said apertures to lock; and
    lever means for releasing said latch mechanism to permit sliding movement of said carriage on said base, said lever means including a release lever carried on said carriage, said release lever being pivotable about a second axis transverse to said first axis, said release lever having an unlocking portion engageable with said latch mechanism for pivoting said latch mechanism about said first axis to remove said locking portion of said latch mechanism from said one of said apertures, said release lever having a manually engageable portion for pivoting said release lever about said second axis.

5. An apparatus as defined in claim 4 wherein said latch member is slidable relative to said carriage under the influence of force applied to the seat belt guide by a restraining seat belt, said base having a surface segment defining said one of said apertures, said slider member having a surface segment defining said opening in said slider member, said surface segments clamping said first end portion of said latch member between said surface segments upon sliding movement of said latch member in a first direction relative to said carriage.

6. An apparatus as defined in claim 5 further including spring means for biasing said latch member toward a position in which said first end portion of said latch member is spaced from said surface segment of said slider member.

7. An apparatus comprising:
    a base mountable on a vehicle body, said base having a plurality of apertures;
    a carriage slidable on said base;
    a seat belt guide carried on said carriage;

a latch mechanism carried on said carriage, said latch mechanism being pivotable about a first axis relative to said carriage, said latch mechanism having a locking portion receivable in one of said apertures for blocking sliding movement of said carriage on said base; and lever means for releasing said latch mechanism to permit sliding movement of said carriage on said base, said lever means including first and second release levers carried on said carriage, said first and second release levers being pivotable about second and third axes, respectively, said second and third axes being transverse to said first axis, each of said first and second release levers having an unlocking portion engageable with said latch mechanism for pivoting said latch mechanism about said first axis to remove said locking portion of said latch mechanism from said one of said apertures, each of said first and second release levers having a manually engageable portion, said manually engageable portions being movable toward each other for pivoting said first and second release levers about said second and third axes, respectively.

8. An apparatus as set forth in claim 7 wherein said latch mechanism includes a spring means for biasing said locking portion of said latch mechanism toward said apertures in said base.

9. An apparatus as defined in claim 8 wherein said base has a plurality of projections spaced from each other along the path of movement of said carriage on said base, said latch mechanism including a pilot member engageable with said projections during sliding movement of said carriage on said base, said pilot member pivoting said latch mechanism about said first axis to move said locking portion of said latch mechanism away from said apertures in said base upon engagement of said pilot member with one of said projections.

10. An apparatus as defined in claim 9 wherein said plurality of projections includes a plurality of pairs of projections, each of said pairs of projections including first and second projections located on first and second sides of said base, respectively, said pilot member engaging the first and second projections in a pair of projections simultaneously as said carriage is moved relative to said base.

11. An apparatus as set forth in claim 7 wherein a portion of said latch mechanism is slidable relative to said carriage under the influence of force applied to said seat belt guide by a seat belt, said base having a surface segment defining one of said apertures, said carriage having a surface segment defining an opening through which said locking portion of said latch mechanism extends said surface segments clamping said locking portion of said portion of said latch mechanism between said surface segments upon sliding movement of said latch mechanism relative to said carriage due to the influence of the forces applied to said seat belt guide by a seat belt.

12. An apparatus as defined in claim 7 wherein said unlocking portions of said first and second release levers include cam surfaces for moving in sliding contact with associated surfaces of said latch mechanism to pivot said latch about said first axis.

13. An apparatus comprising:
a base mountable on a vehicle body, said base including a back portion for location adjacent to a mounting portion of the vehicle body and having a plurality of apertures, said back portion extending in a plane;
a carriage slidable on said base;
a seat belt guide carried on said carriage;
a latch mechanism carried on said carriage, said latch mechanism being pivotable about a first axis relative to said carriage, said first axis being parallel to the plane in which said back portion extends, said latch mechanism having a locking portion receivable in one of said apertures for blocking sliding movement of said carriage on said base; and
lever means for releasing said latch mechanism to permit sliding movement of said carriage on said base, said lever means including a release lever carried on said carriage, said release lever being pivotable about a second axis transverse to said first axis, said release lever having an unlocking portion engageable with said latch mechanism for pivoting said latch mechanism about said first axis to remove said locking portion of said latch mechanism from said one of said apertures, said release lever having a manually engageable portion for pivoting said release lever about said second axis.

14. An apparatus as defined in claim 13 wherein said latch mechanism comprises a latch member pivotable about said first axis and having a first end portion and a second end portion, said first end portion being supported for pivotal movement about said second end portion upon pivotal movement of said latch member about said first axis, said first end portion of said latch member being said locking portion of said latch mechanism.

15. An apparatus as defined in claim 14 wherein said latch member has a first cam surface, said unlocking portion of said release lever including a second cam surface, said second cam surface being movable in sliding contact with said first cam surface to pivot said latch member about said first axis upon pivoting of said release lever about said second axis.

16. An apparatus as defined in claim 14 further comprising spring means for biasing said latch member toward said apertures in said base.

17. An apparatus comprising:
a base mountable on a vehicle body, said base having a plurality of apertures;
a carriage slidable on said base;
a seat belt guide carried on said carriage;
a latch mechanism carried on said carriage, said latch mechanism being pivotable about a first axis relative to said carriage, said latch mechanism having a locking portion receivable in one of said apertures for blocking sliding movement of said carriage on said base; and
lever means for releasing said latch mechanism to permit sliding movement of said carriage on said base, said lever means including a release lever carried on said carriage, said release lever being pivotable about a second axis transverse to said first axis, said release lever having an unlocking means for engaging said latch mechanism and for sliding on said latch mechanism between said latch mechanism and said base to relatively lift a portion of said latch mechanism and to pivot said latch mechanism about said first axis to remove said locking portion of said latch mechanism from said one of said apertures, said release lever having a manually engageable portion for pivoting said release lever about said second axis.

18. An apparatus as defined in claim 17 wherein said carriage is slidable along an axis of said base, said first axis being perpendicular to said axis of said base, said second axis being perpendicular to said first axis and said axis of said base.

19. An apparatus as set forth in claim 17 wherein said unlocking means includes a portion of said lever which moves relatively beneath said portion of said latch mechanism for lifting said portion of said latch mechanism relative to a portion of said base.

* * * * *